US012574722B2

(12) United States Patent
Smith

(10) Patent No.: US 12,574,722 B2
(45) Date of Patent: Mar. 10, 2026

(54) IDENTIFICATION OF WIRELESS LOCAL AREA NETWORK STATIONS USING RANDOM MEDIUM ACCESS CONTROL ADDRESSING

(71) Applicant: SR Technologies, Inc., Sunrise, FL (US)

(72) Inventor: Graham K. Smith, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 19/228,495

(22) Filed: Jun. 4, 2025

(65) Prior Publication Data

US 2025/0310757 A1 Oct. 2, 2025

Related U.S. Application Data

(63) Continuation of application No. 18/656,116, filed on May 6, 2024, now Pat. No. 12,349,236, which is a continuation of application No. 18/446,165, filed on Aug. 8, 2023, now Pat. No. 11,979,944.

(60) Provisional application No. 63/397,994, filed on Aug. 15, 2022.

(51) Int. Cl.
*H04W 8/26* (2009.01)
*H04W 8/22* (2009.01)
*H04W 60/00* (2009.01)
*H04W 84/12* (2009.01)

(52) U.S. Cl.
CPC .............. *H04W 8/26* (2013.01); *H04W 8/22* (2013.01); *H04W 60/00* (2013.01); *H04W 84/12* (2013.01)

(58) Field of Classification Search
CPC ......... H04W 8/26; H04W 8/72; H04W 60/00; H04W 84/12
See application file for complete search history.

(56) References Cited

U.S. PATENT DOCUMENTS

| | | | | |
|---|---|---|---|---|
| 10,499,220 B2 * | 12/2019 | Kuo | ...................... | H04W 12/35 |
| 10,812,964 B2 * | 10/2020 | McCann | ............... | H04W 8/087 |
| 2016/0142955 A1 * | 5/2016 | Hedberg | ............. | H04W 12/062 |
| | | | | 370/331 |
| 2020/0305118 A1 * | 9/2020 | Ryu | ...................... | H04W 76/10 |
| 2021/0014679 A1 * | 1/2021 | Liu | ........................ | H04W 12/50 |
| 2021/0168115 A1 * | 6/2021 | de la Oliva | ........... | H04W 12/06 |
| 2021/0289337 A1 * | 9/2021 | Yu | ............................ | H04W 8/04 |
| 2022/0086627 A1 * | 3/2022 | Montemurro | ........... | H04L 61/25 |
| 2022/0232506 A1 * | 7/2022 | Lai | ........................ | H04W 60/04 |

* cited by examiner

*Primary Examiner* — Jinsong Hu
(74) *Attorney, Agent, or Firm* — Goodwin Procter LLP

(57) ABSTRACT

A method in a mobile station (STA) configured to associate to an access point (AP) is described. The method includes determining an identifiable random medium access control (MAC) address (IRMA), associating to the AP and transmitting the IRMA to the AP during the association. The method also includes using the IRMA as the transmitter address (TA) a next time the STA begins to associate to the AP, where the IRMA is usable by the AP to identify the STA prior to a next association, determining a new IRMA, and transmitting the new IRMA to the AP during the next association. One or more additional associations to the AP are performed at least by transmitting at least a corresponding IRMA to the AP and indicating that the corresponding IRMA is a TA of the STA.

20 Claims, 10 Drawing Sheets

| Bit | Information | Notes |
|-----|-------------|-------|
| <ANA> | IRM Capability | The STA or AP sets IRM Capability subfield to 1 to indicate support for IRM and sets to 0 if IRM is not supported. |

IRM Capability addition to
Extended Capabilities field

*FIG. 5*

| 501 | 502 | 503 | 504 | 505 |
|---|---|---|---|---|
| Type (0xdd) | Length | OUI | Data Type (IRMA) | Data (IRMA) |

500

KDE format

IDENTIFICATION OF WIRELESS LOCAL AREA NETWORK STATIONS USING RANDOM MEDIUM ACCESS CONTROL ADDRESSING

CROSS-REFERENCE TO RELATED APPLICATIONS

This application is a continuation of U.S. patent application Ser. No. 18/656,116, filed May 6, 2024, entitled "IDENTIFICATION OF WIRELESS LOCAL AREA NETWORK STATIONS USING RANDOM MEDIUM ACCESS CONTROL ADDRESSING", which is a continuation of U.S. patent application Ser. No. 18/446,165, filed Aug. 8, 2023, entitled "IDENTIFICATION OF WIRELESS LOCAL AREA NETWORK STATIONS USING RANDOM MEDIUM ACCESS CONTROL ADDRESSING," and which is related to and claims priority to U.S. Provisional Patent Application Ser. No. 63/397,994, filed Aug. 15, 2022, entitled "IDENTIFICATION OF WLAN STATION USING RANDOM MAC ADDRESSING," the entireties of both of which are incorporated herein by reference.

TECHNICAL FIELD

The present disclosure relates arrangements for addressing in wireless local area networks (WLANs).

BACKGROUND

Initially, it is noted that Institute of Electrical and Electronics Engineers (IEEE) Standard 802.11-2020 is used as the base reference for disclosures used herein, the entire contents of which are incorporated herein by reference. The IEEE 802.11-2020 Standard is commonly referred to as "Wi-Fi" and may be referred to as such or simply as "the Standard" herein. This disclosure relates to the addressing used by devices that are based upon the IEEE 802.11 technology.

The medium access control (MAC) address of a Wi-Fi device has historically been a unique hardware address that identified the device. However, having this MAC address openly broadcast has meant that the device may be easily observed and tracked, without the user's permission.

Figure 1:
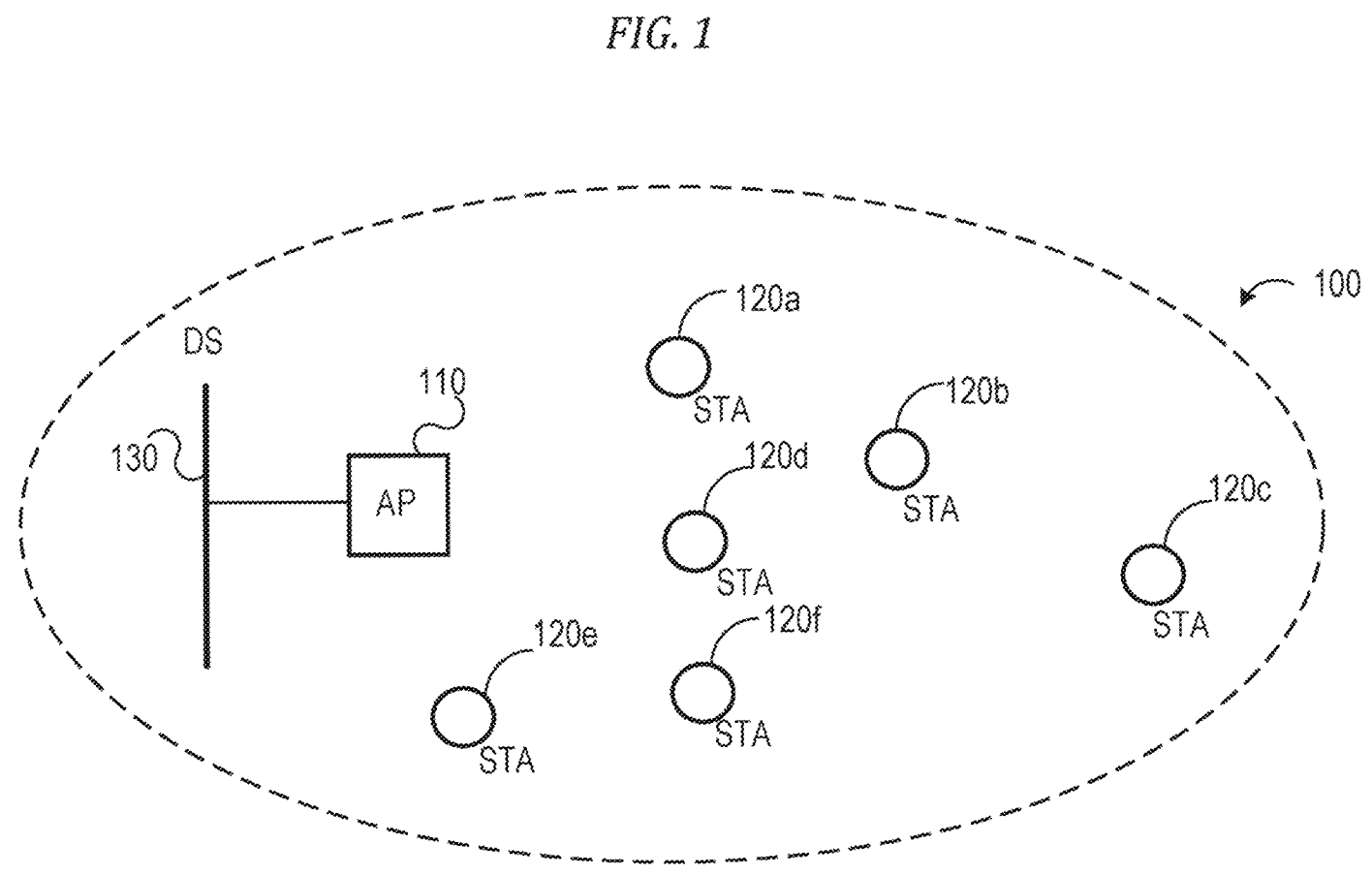

FIG. 1 is a block schematic diagram of a typical IEEE 802.11 infrastructure network 100. A number of mobile nodes, or stations (STAs) 120a, 120b, 120c, 120d, 120e and 120f (collectively referred to as "STAs 120") may or may not be associated with access point AP 110 which, in turn, is in communication with a hard-wired distribution system (DS) 130. In such a network, the access point (AP) 110 will periodically transmit beacons in order to allow the unassociated STAs 120 (e.g., mobile nodes) to locate and identify the network, and will allow the AP 110 to convey information to the associated STAs 120.

FIG. 2 depicts a format of an IEEE 802.11 Management frame 200. The frame 200 consists of a MAC Header 210, which comprises Frame Control, Duration, Address fields, optionally Sequence Control information and optional HT Control fields, a variable length Frame Body 220 and a Frame Check Sum (FCS) 230. Type and Subtype fields in the Frame Control field 212 define the function of the frame, e.g., Association Request is Type 00, Subtype 0000. In the MAC Header 210, Address 1 215 identifies the receive address (RA) of the intended receiver of the frame, and Address 2 216 identifies the transmit address (TA) of the transmitter of the frame. Each address field contains a 48-bit address known as a MAC address where the Individual/Group I/G bit is always transmitted first, and the Universal/Local U/L bit is transmitted second. A MAC address where the U/L bit is set to 1 is referred to as being a "locally administered MAC address".

In order to associate to the AP 110, STA 120 sends an Association Request management frame to the AP 110 with Address 1 215 set to the MAC address of the AP 110, and Address 2, TA 216, set to the STA's MAC address. Similarly, if STA 120 is searching for AP 110, it may transmit Probe Request management frames again setting Address 2 TA 216 to the MAC address of the STA 120.

As described in the Standard (e.g., Clause 4.5.4.10), when a Wi-Fi station, STA 120, is searching for, or connects to a Wi-Fi network, i.e., an AP 110, it defines the addressing of its MAC layer for the particular connection. Similarly, when a STA attempts to discover services on a network, before associating, i.e., preassociation, it also defines the addressing of its MAC layer. If STA 120 uses a fixed MAC address, it is trivial to track the STA 120, and this tracking may be used to glean private and sensitive information regarding the individual behind the STA 120. Furthermore, even without establishing a connection, a mobile or portable STA 120 that gratuitously transmits Probe Request frames containing service set identifiers (SSIDs) of favored networks, can reveal potentially sensitive information about the STA's location and location history. To mitigate this privacy concern, a STA may periodically change its MAC address prior to association.

"Requirements for support of MAC privacy enhancements" was introduced in the IEEE 802.11-2020 Standard. The Standard states that a STA may periodically change its MAC address to a random value while not associated. The STA shall, however, set the locally administered address bit in the MAC address. However, if the STA is (re)associating with an AP with which it has been previously associated, the STA should change its MAC address to that used when previously associated.

The introduction of MAC randomization has generally prevented the tracking of users but has also caused impact and problems with some network operations and "use cases" that require knowledge of an identity of a STA. In other words, randomization of the MAC address can create issues. Such issues may include the steering of STAs to appropriate APs/networks, parental controls, network access controls, device limits, and diagnostics. The requirement that a STA 120 uses the same MAC address every time it (re)associates to the same AP 110 does mitigate some of the issues to some extent, but this requirement still has privacy concerns.

SUMMARY

According to an aspect, a method in a mobile station (STA) configured to associate to an access point (AP) is described. The method includes determining an identifiable random medium access control (MAC) address (IRMA), associating to the AP and transmitting the IRMA to the AP during the association. The method also includes using the IRMA as the transmitter address (TA) a next time the STA begins to associate to the AP, where the IRMA is usable by the AP to identify the STA prior to a next association, determining a new IRMA, and transmitting the new IRMA to the AP during the next association. One or more additional associations to the AP are performed at least by transmitting at least a corresponding IRMA to the AP and indicating that the corresponding IRMA is a TA of the STA.

According to another aspect, a mobile station (STA) configured to associate to an access point (AP) is described. The STA includes processing circuitry configured to determine an identifiable random medium access control (MAC) address (IRMA), associate to the AP and cause transmission of the IRMA to the AP during the association, and use the IRMA as the transmitter address (TA) a next time the STA begins to associate to the AP. The IRMA is usable by the AP to identify the STA prior to a next association. The processing circuitry is further configured to determine a new IRMA and cause transmission of the new IRMA to the AP during the next association and perform one or more additional associations to the AP at least by causing transmission of at least a corresponding IRMA to the AP and indicating that the corresponding IRMA is a TA of the STA.

A system that includes a mobile station (STA) and an access point (AP) is described. The STA includes first processing circuitry configured to determine an identifiable random medium access control (MAC) address (IRMA), associate to an AP and cause transmission of the IRMA to the AP during the association, and use the IRMA as the transmitter address (TA) a next time the STA begins to associate to the AP. The IRMA is usable by the AP to identify the STA prior to a next association. The first processing circuitry is further configured to determine a new IRMA and cause transmission of the new IRMA to the AP during the next association and perform one or more additional associations to the AP at least by causing transmission of at least a corresponding IRMA to the AP and indicating that the corresponding IRMA is a TA of the STA. The AP includes second processing circuitry configured to identify the STA prior to a next association using the IRMA as the TA of the STA, receive the new IRMA during the next association, and perform the one or more additional associations using the corresponding IRMA as the TA of the STA.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 is a block schematic diagram of a typical IEEE 802.11 infrastructure network;

FIG. 3 depicts an example of a Capability bit, identifiable random MAC (IRM) Capability that may be added to the Extended Capabilities Information element;

FIG. 5 depicts an example of a key data encapsulation key data encapsulation (KDE) format (IRMA KDE);

DETAILED DESCRIPTION

A method, and apparatus for the identification of wireless local area network stations is disclosed such that a STA 120 may indicate to an AP 110, that the MAC address used by the STA 120 is random but also "identifiable". While still preventing third parties from tracking the STA 120, a trusted AP 110 can recognize or identify that STA 120.

Figure 2:
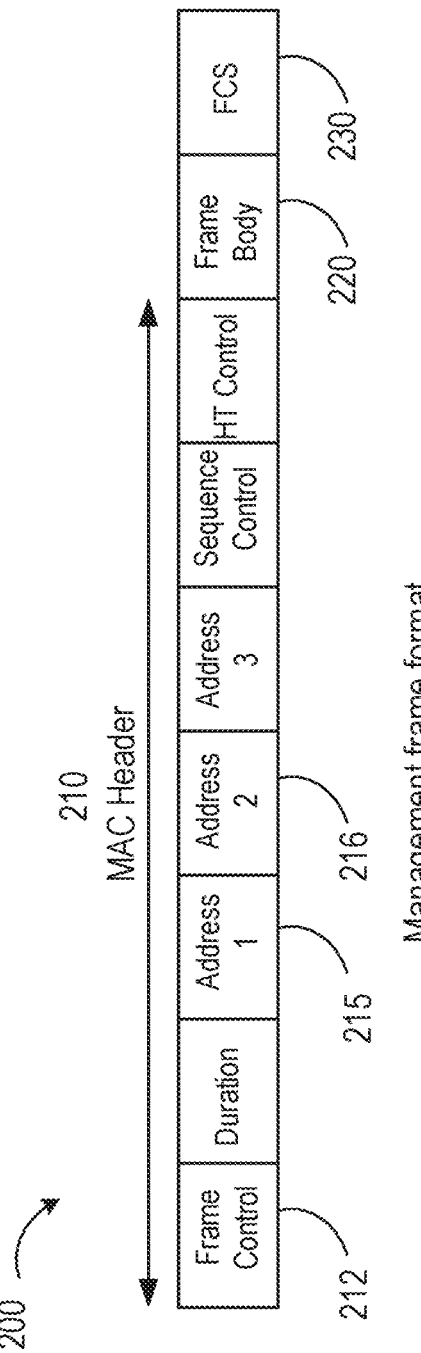
FIG. 2 depicts the IEEE 802.11 Management frame format.

Referring again to the drawing figures in which like reference designators refer to like elements, an example Association Request management frame has the format shown in FIG. 2.

A more complete understanding of the present invention, and the attendant advantages and features thereof, will be more readily understood by reference to the following definitions for certain terms used herein:

"identifiable random MAC (IRM)": an arrangement where a non-AP STA uses identifiable random MAC addresses (IRMAs) to prevent third parties from tracking the non-AP STA while still allowing trusted parties to identify the non-AP STA.

"identifiable random MAC address (IRMA)": a randomized MAC address used by a STA using IRM.

FIG. 3 depicts an example of a Capability bit, IRM Capability, 300, that may be added to the Extended Capabilities Information element. An AP 110 may include this IRM Capability bit 300 in the Extended Capabilities Information element in its beacons to indicate that the AP 110 supports IRM. A STA 120 may include this IRM Capability bit 300 in the Extended Capabilities Information element in its Association Request frame to indicate that the STA 120 supports IRM. The position of the bit in the Extended Capabilities Information element is assigned by the 802.11 Working Group Assigned Numbers Authority (ANA). Setting the bit to 0, or omitting the bit, indicates that IRM is not supported.

A STA 120 may advertise support for IRM by setting the IRM Capability subfield 300 to 1 in the Extended Capabilities element in Probe Request, Association Request and Reassociation Request frames. An AP 110 may advertise support for IRM by setting the IRM Capability subfield 300 to 1 in the Extended Capabilities element in its Beacon and Probe Response frames.

Each time the STA 120 associates to an AP 110, the STA 120 sends a new IRMA to the AP 110. The AP 110 can then store that IRMA as an identifier for that STA 120. The next time that STA 120 associates to that AP 110, it uses that new IRMA, provided to the AP at the previous association, as the TA 216 in the association request and association.

A list of IRMAs and STAs 120 may be stored by the AP 110 and used as an identifier for each STA 120 that has previously associated. A STA 120 may store the last IRMA exchanged with a particular AP 110 such that the next time the STA 120 associates to that AP 110, the AP 110 can identify the STA 120.

If the STA 120 is associating using an identifiable random MAC address (IRMA), then AP 110 may search a stored list of STAs and IRMAs for STAs that had previously associated and, if that STA 120 had previously associated to AP 110, match the respective IRMA to the TA being used by STA 120 and hence identify the STA 120. If STA 120 had not previously associated to AP 110, e.g., this is the first time for an association, then AP 110 may wait until STA 120 associates and provides an IRMA which AP 110 may store for the next time STA 120 may associate.

Figure 4:
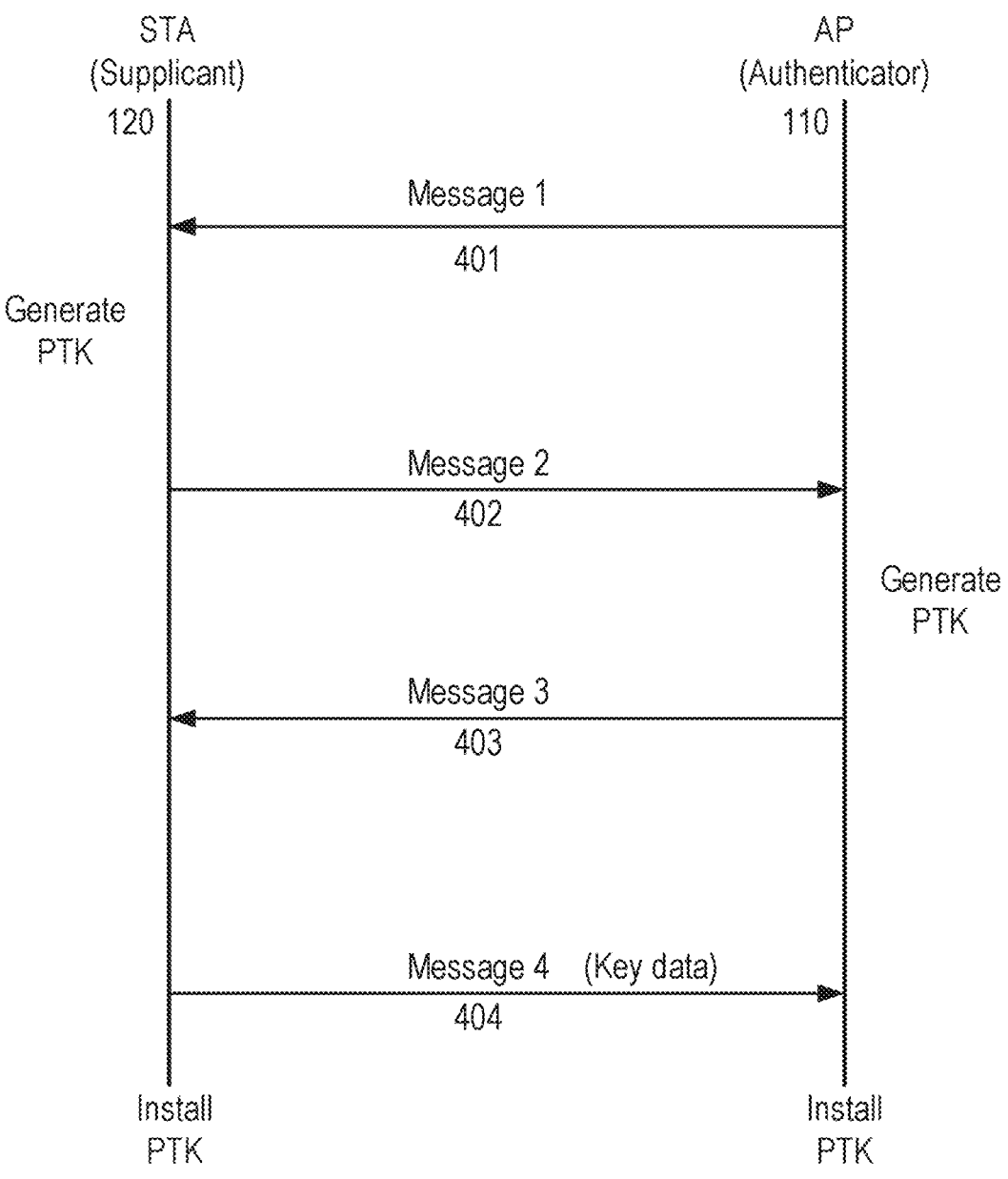
FIG. 4 is a diagram of examples of the messages exchanged during the 4-way handshake that occurs when a STA associates with an AP 110 using robust secure network association.

FIG. 4 is a diagram of examples of a message exchange flow during the 4-way handshake that occurs when a STA 120 associates with an AP 110 using robust secure network association RSNA. The 4-way handshake is specified in detail in the Standard hence only an outline of the procedure is described herein. Both the STA 120 and the AP 110 share a pairwise master key (PMK), i.e., the network "password". The handshake starts when AP 110 sends message 1 401 to the STA 120 which STA 120 uses to generate a pairwise transient key (PTK). STA 120 then sends message 2 402 to AP 110 with information such that AP 110 can also generate the PTK. AP 110 then sends message 3 403 that contains the group temporal key GTK to STA 120 and message 4 404 is sent by STA 120 to AP 110 to confirm that the keys PTK and GTK have been installed. In message 2 402 and/or message 4 404, the STA 120 may include a "Key Data" field which is a variable length field used to include additional data. This "key data encapsulation", KDE field is protected and may be used by STA 120 to send a new IRMA to AP 110.

Figure 5:
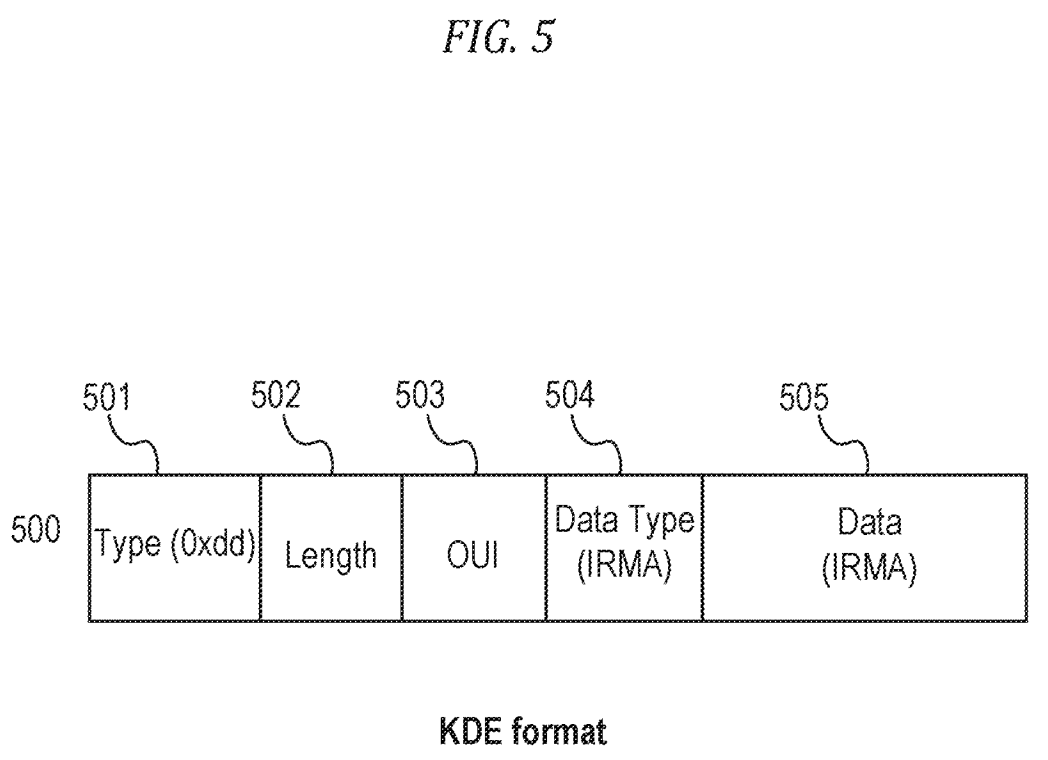

FIG. 5 depicts an example of a key data encapsulation KDE format 500, IRMA KDE. The Type field 501 is set to 0xdd as specified in the Standard for KDEs. The Length field 502 specifies the number of octets in the following fields 503, 504 and 505. As specified in "Table 12-9—KDE selectors" in the Standard, the OUI field is set to 00-0F-AC. The data type field 504 is used to define the meaning of the KDE. A new data type may be assigned with associated meaning "IRMA", i.e., a new data type may be added to Table 12-9—KDE selectors in the Standard. In the case that the KDE is used for the allocation of the IRMA then the data type field 504 is set to a value that indicates this is an IRMA KDE and the data field 505 contains the new IRMA, i.e., a random MAC address of 48 bits.

Figure 6:
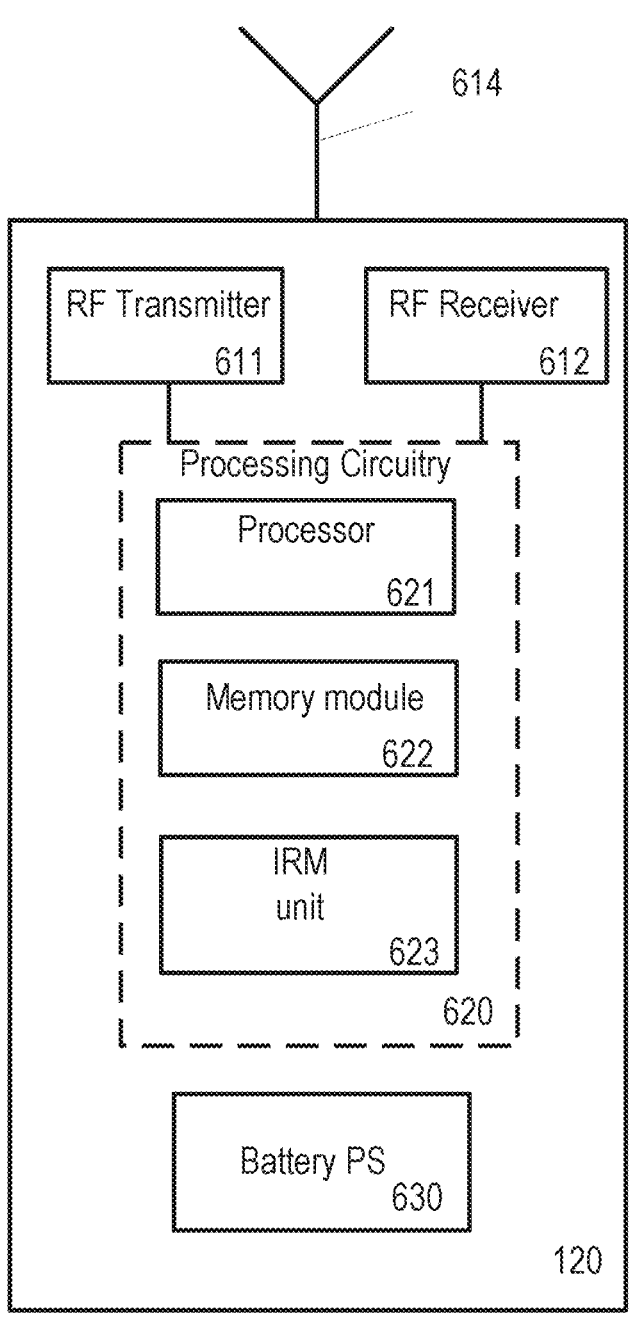
FIG. 6 illustrates an example of a STA 120 and its components, according to embodiments of the present disclosure.

FIG. 6 illustrates an example of a STA 120, according to embodiments of the present disclosure. STA 120 may be a wireless device or a mobile station that is based upon the IEEE 802.11 specification. In one embodiment, STA 120 may include an antenna assembly 614, a radio frequency (RF) receiver 612, an RF transmitter 611, processing circuitry 620 and a battery powered power supply 630. The antenna assembly 614 may comprise several antennas such that STA 120 may transmit and receive signals in the various frequency bands covered by the 802.11 specification and enable features such as multiple input multiple output (MIMO) and beamforming. The RF receiver 612 may receive radio frequency (RF) signals from the antenna assembly 614. The RF receiver 612 may comprise one or more receiver paths. The RF receiver 612 may perform the usual functions of an RF receiver such as low noise amplification, filtering, and frequency down conversion so as to condition the received signal suitable for inputting to the processing circuitry 620. The processing circuitry 620 may perform the usual baseband functions such as demodulation, descrambling, and error correction of received packets as described in the Standard and may also perform the functions required by IRM for a STA 120 as described in this disclosure. The RF transmitter 611 may comprise one or more transmitter paths. The RF transmitter 611 may perform the usual functions of an RF transmitter such as up conversion, filtering and power amplification of the baseband signal received from the processing circuitry 620. The processing circuitry 620 may perform the usual baseband functions such as coding, scrambling and modulation of packets to be transmitted as described in the Standard.

The processing circuitry 620 may include a processor 621, a memory 622, and the IRM unit 623. In addition to a traditional processor and memory, processing circuitry 620 may comprise integrated circuitry for processing and/or control, e.g., one or more processors and/or processor cores and/or FPGAs (Field Programmable Gate Array) and/or ASICs (Application Specific Integrated Circuitry). Processor 621 may be configured to access (e.g., write to and/or reading from) memory 622, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 622 may be configured to store code executable by processor 621 and/or other data, e.g., data pertaining to communication, e.g., configuration and/or address data of nodes, etc.

Processing circuitry 620 may be configured to control any of the methods and/or processes described herein and/or to cause such methods and/or processes to be performed, e.g., by STA 120. Corresponding instructions may be stored in the memory 622 and/or in the IRM unit 623, which may be readable and/or readably connected to processor 621. In other words, processing circuitry 620 may comprise a microprocessor and/or microcontroller and/or FPGA (Field-Programmable Gate Array) device and/or ASIC (Application Specific Integrated Circuit) device. The IRM unit 623 may be configured to perform the any of the processes described herein such as determining values for use as IRMAs and writing to the memory 622 for the storage of the allocated IRMAs and their corresponding APs.

Figure 7:
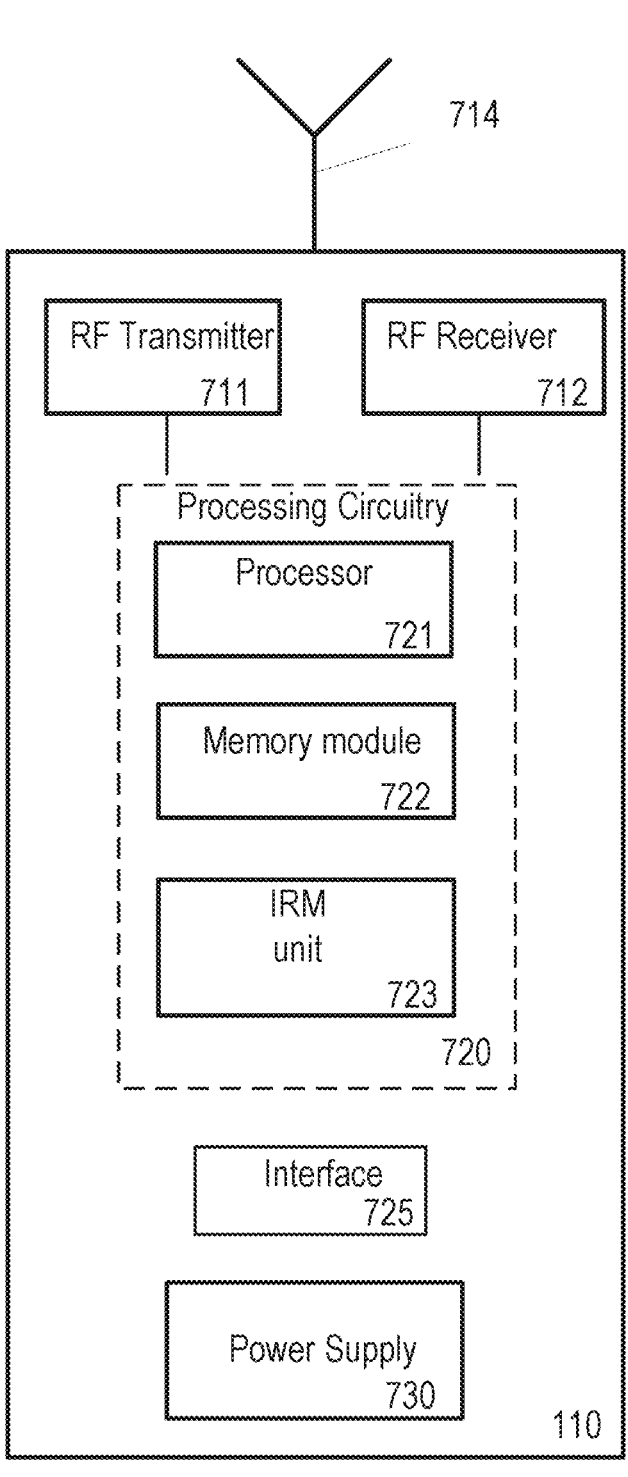
FIG. 7 illustrates an example of an AP 110 and its components, according to embodiments of the present disclosure.

FIG. 7 illustrates an example of an access point AP 110, according to embodiments of the present disclosure. AP 110 may be a wireless device that is based upon the IEEE 802.11 specification. In one embodiment, AP 110 may include an antenna assembly 714, a radio frequency (RF) receiver 712, an RF transmitter 711, processing circuitry 720, an interface 725 and a power supply 730. Interface 725 may connect the processing circuitry 720 via Ethernet to the DS 130. Antenna assembly 714 may comprise several antennas such that AP 110 may transmit and receive signals in the various frequency bands covered by the 802.11 specification and enable features such as multiple input multiple output (MIMO) and beamforming. The RF receiver 712 may receive radio frequency (RF) signals from the antenna assembly 714. The RF receiver 712 may comprise one or more receiver paths. The RF receiver 712 may perform the usual functions of an RF receiver such as low noise amplification, filtering, and frequency down conversion so as to condition the received signal suitable for inputting to the processing circuitry 720. The processing circuitry 720 may perform the usual baseband functions such as demodulation, descrambling, and error correction of received packets as described in the Standard and may also perform the functions required by an AP 110 for IRM as described in this disclosure. The RF transmitter 711 may comprise one or more transmitter paths. The RF transmitter 711 may perform the usual function of an RF transmitter such as up conversion, filtering and power amplification of the baseband signal received from the processing circuitry 720. The processing circuitry 720 may perform the usual baseband functions such as coding, scrambling and modulation of packets to be transmitted as described in the Standard.

The processing circuitry 720 may include a processor 721, a memory 722, and the IRM unit 723. In addition to a traditional processor and memory, processing circuitry 720 may comprise integrated circuitry for processing and/or control, e.g., one or more processors and/or processor cores and/or FPGAs (Field Programmable Gate Array) and/or ASICs (Application Specific Integrated Circuitry). Processor 721 may be configured to access (e.g., write to and/or reading from) memory 722, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 722 may be configured to store code executable by processor 721 and/or other data, e.g., data pertaining to communication, e.g., configuration and/or address data of nodes, etc.

Processing circuitry 720 may be configured to control any of the methods and/or processes described herein and/or to cause such methods and/or processes to be performed, e.g., by AP 110. Corresponding instructions may be stored in the memory 722, and/or the IRM unit 723 which may be readable and/or readably connected to processor 721. In other words, processing circuitry 720 may comprise a microprocessor and/or microcontroller and/or FPGA (Field-Programmable Gate Array) device and/or ASIC (Application Specific Integrated Circuit) device. The IRM unit 723 may be configured to perform any of the processes described herein such as searching memory 722 for a stored IRMA and writing to the memory 722 for the storage of the allocated IRMAs and their corresponding STAs.

Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing circuitries 620 and 720 may include the memory 622 and 722 respectively, a processor 621 and 721 respectively, the memories 622 and 722 containing instructions which, when executed by the processors 621 and 721 respectively, configure the processor 621 or 721 to perform the one or more functions described herein. Similarly, in some embodiments, the processing circuitries 620 and 720 may include the memory 622 and 722 respectively, an IRM unit 623 and 723 respectively, the memories 622 and 722 containing instructions which, when executed by the IRM units 623 and 723 respectively, configure the processor 621 or 721 to perform the one or more functions described herein. In addition to a traditional processor and memory, the processing circuitries 620 and 720 may comprise integrated circuitry for processing and/or control, e.g., one or more processors and/or processor cores and/or FPGAs (Field Programmable Gate Array) and/or ASICs (Application Specific Integrated Circuitry).

The processors 621 and 721 may include and/or be connected to and/or be configured for accessing (e.g., writing to and/or reading from) the memories 622 and 722 respectively, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 622 and 722 may be configured to store code executable by control circuitry and/or other data, e.g., data pertaining to communication, configuration and/or address data of nodes, etc. The processing circuitry 620 and 720 may be configured to control any of the methods described herein and/or to cause such methods to be performed, e.g., by the processors 621 and 721 or by the IRM units 623 and 723. Corresponding instructions may be stored in the memory 622 or 722, which may be readable and/or readably connected to the processing circuitry 620 or 720. In other words, the processing circuitries 620 and 720 may include a controller, which may comprise a microprocessor and/or microcontroller and/or FPGA (Field-Programmable Gate Array) device and/or ASIC (Application Specific Integrated Circuit) device. It may be considered that the processing circuitries 620 and 720 include or may be connected or connectable to memory, which may be configured to be accessible for reading and/or writing by the controller and/or processing circuitry 620 or 720.

According to an embodiment of the disclosure, STA 120 is arranged to receive transmissions of another wireless device such as AP 110, and processing circuitry 620 is arranged to monitor attributes of those transmissions. For example, processing circuitry 620 or IRM unit 623 may be arranged to monitor attributes of beacon transmissions of AP 110 and determine that AP 110 supports IRM by examination of the Extended Capabilities field in the Beacon and determining that the IRM capability bit is set therein. STA 120 is arranged to transmit to AP 110 an Association Request frame. AP 110 is arranged to monitor the Association Request frame from STA 120. The processing circuitry 720 in AP 110 may be arranged to check through stored IRMAs to find the IRMA that matches the TA 216 (IRMA) in the Association Request sent by STA 120. Similarly, memory 622 in STA 120 may be arranged to store the IRMAs that it provided when last associating to each AP 110.

According to an embodiment of the disclosure, STA 120 and AP 110 are arranged to be capable of carrying out the function of association, as described in the Standard, and to carry out the 4-way handshake as discussed above with reference to FIG. 4. STA 120 is arranged to be capable of inserting an IRMA KDE frame 500 into message 2 402 or message 4 404 of the 4-way handshake and AP 110 is arranged to recognize and decode the IRMA KDE frame 500 and in particular the IRMA subfield 505. This recognition and decoding may take place in the IRM unit 723.

Figure 8:
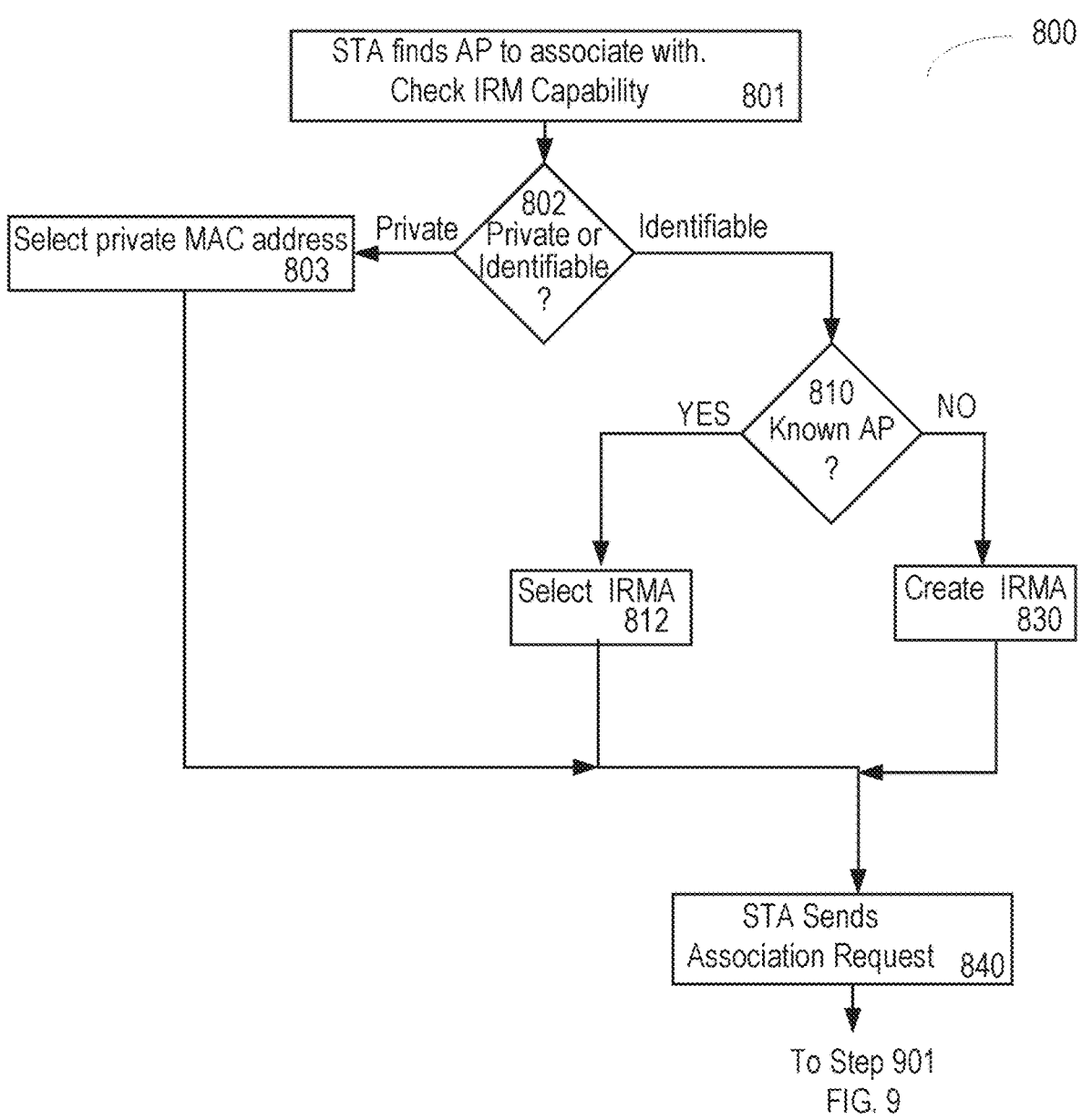
FIG. 8 is an example flow diagram illustrating an embodiment of the method of the present disclosure when STA 120 is preparing to associate to AP 110.

FIG. 8 is an example flow diagram 800 illustrating an embodiment of the method of the present disclosure when STA 120 is preparing to associate to AP 110. Both STA 120 and AP 110 have set the IRM Capability bit 300 in their Extended Capabilities fields as discussed above with reference to FIG. 3. The method of clow diagram 800 may start with step 801 where STA 120 receives beacons from AP 110 and checks the attributes and decides to associate. At step 802, STA 120 may make a decision as to whether to use a private random MAC address, or an IRMA. As an example, even though the AP 110 supports IRM, a user setting may have been set that instructs the STA 120 to use a private random MAC address. If, at step 802, STA 120 has chosen to use a private address, then in step 803, STA 120 selects or calculates a private random MAC address and at step 840 STA 120 may send an Association Request to AP 110.

If, at step 802, STA 120 has chosen to use an identifiable address, then at step 810 STA 120 may check if AP 110 is an AP that STA 120 has previously associated to and has previously provided an IRMA to. If so, then step 810 may be followed by step 812 where STA 120 may select the IRMA that it used with AP 110 in its last association. STA 120 may store a list of APs and IRMAs in memory 622 and IRM unit 623 may be arranged to search through that list to determine if AP 110 and an associated IRMA is present.

If, at step 810 STA 120 determines that AP 110 is an AP that STA 120 has not previously associated to and has not previously provided an IRMA to, then at step 830, STA 120 may create an IRMA which may be used as an identifier for STA 120 with AP 110. For example, STA 120 may store a list of APs and IRMAs in memory 622 and IRM unit 623 may be arranged to search through that list to determine that AP 110 is not present.

Steps 812 or 830 may be followed by step 840 where STA 120 sends an Association Request frame to AP 110. The Association Request frame may be constructed by processing circuitry 620 and then transmitted via RF transmitter 611 and antenna assembly 614. The method may continue to step 901 in FIG. 9.

Figure 9:
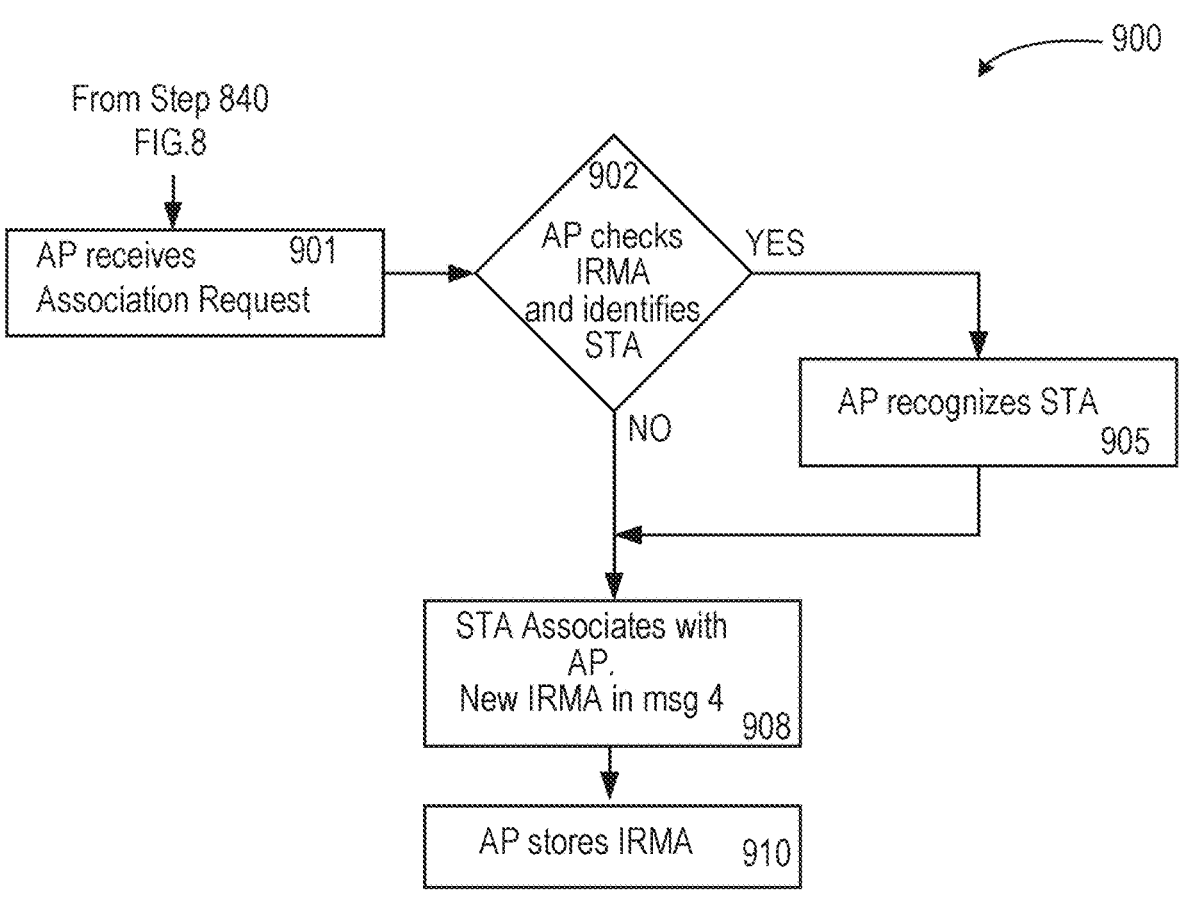
FIG. 9 is an example flow diagram illustrating an embodiment of the method of the present disclosure, when STA associates to AP.

FIG. 9 is an example flow diagram 900 illustrating an embodiment of the method of the present disclosure, when STA 120 associates to AP 110. The method of flow diagram 900 may start with step 901 where AP 110 receives an Association Request, from STA 120. At step 902, AP 110 may check through its list of IRMAs and STAs in order to find a stored IRMA that matches the TA 216 in the Association Request. If a match is found, then at step 905, AP 110 has identified or recognized STA 120. IRM unit 723 in processing circuitry 720 may be arranged search a list of IRMAs and STAs stored in memory 722. At step 908, STA 120 may associate with AP 110 and in message 2 402 or message 4 404 of the 4-way handshake, STA 120 will include an IRMA KDE 500 that includes a new IRMA 505. At step 910, AP 110 may store the new IRMA, received at step 908, in memory module 922. If at step 902 AP 110 checks through its list of IRMAs and STAs and does not find a stored IRMA that matches the TA 216 in the Association Request, then the process advances to step 908.

If STA 120 does not want to be identified, then at step 908, STA 120 does not include an IRMA KDE in message 4 of the 4-way handshake.

If STA 120 sends directed probe requests to AP 110, then, if STA 120 has an IRMA stored at that AP 110, then AP 110 can identify STA 120 preassociation by checking through its list of IRMAs and STAs.

An AP 110 may maintain a list of stored IRMAs and STAs 120. The AP 110 can use this list to identify a specific STA 120 associated to an IRMA. The AP 110 may determine further information or IDs about an associated non-AP STA such as membership number, guest information, family member, subscription, etc., using, for example, a higher layer application. The IRMA is used to simply identify the STA 120, but the IRMA contains no information about the STA 120 or its user.

Figure 10:
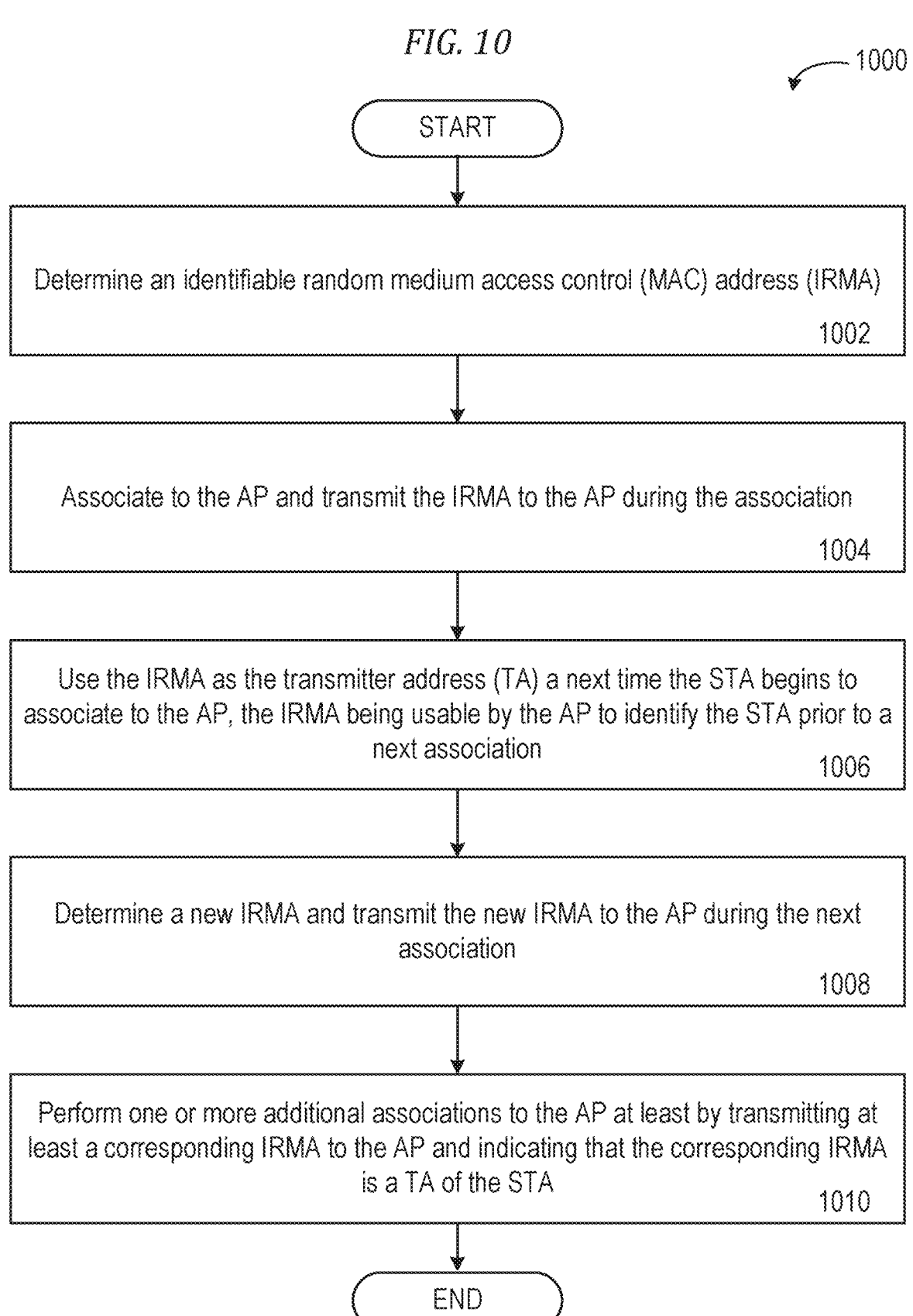
FIG. 10 shows an example method implemented in a STA 120, according to embodiments of the present disclosure.

FIG. 10 shows an example method 1000 (e.g., implemented in a STA 120) according to some embodiments of the present disclosure. At step 1002, an IRMA is determined. Further, the method includes, at step 1004, associating to the AP 110 and transmitting the IRMA to the AP 110 during the association, and at step 1006, using the IRMA as TA a next time the STA 120 begins to associate to the AP 110, where the IRMA is usable by the AP 110 to identify the STA 120 prior to a next association. In addition, the method includes, at step S1008, determining a new IRMA and transmitting the new IRMA to the AP 110 during the next association and, at step S1010, performing one or more additional associations to the AP 110 at least by transmitting at least a corresponding IRMA to the AP 110 and indicating that the corresponding IRMA is a TA of the STA 120.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the details of the frame formats; the nomenclature used for fields in the frames; the order of the steps in the methods 1000, and 1100; the number of bits in the IRM Hash; the number of bits in the IRMK; the hash function used to determine the IRM Hash. Accordingly, the scope should be determined not by the embodiments illustrated, but by the claims and embodiments.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for operating a mobile station (STA) to associate with an access point (AP) using an identifiable random medium access control (MAC) address (IRMA), the method comprising:

receiving, at a STA, a beacon from an AP;

determining whether the AP supports identifiable random MAC (IRM) based on an IRM capability bit of the received beacon;

in response to determining that the AP supports IRM, further determining whether to associate the STA with the AP using IRM;

in response to determining to associate the STA with the AP using IRM, generating a message that includes an IRMA; and transmitting, from the STA, the message to the AP.

2. The method of claim 1, wherein the message is an association request.

3. The method of claim 2, wherein the association request includes a random MAC address as a transmitter address.

4. The method of claim 2, further comprising:

setting a capability bit of the association request to indicate that the STA supports IRM.

5. The method of claim 1, further comprising:

determining whether the STA has previously associated with the AP;

in response to determining that the STA has previously associated with the AP, selecting a respective IRMA previously provided by the STA to the AP in a corresponding previous association with the AP as the IRMA to be included in the message; and in response to determining that the STA has not previously associated with the AP, selecting a random MAC address and creating a new IRMA to be included as the IRMA in the message.

6. The method of claim 5, wherein determining whether the STA has previously associated with the AP comprises selecting the IRMA previously provided by the STA to the AP from a list of IRMAs already provided by the STA to APs previously associated with the STA.

7. The method of claim 1, wherein the message is transmitted to the AP as part of a four-way handshake process.

8. The method of claim 7, wherein the IRMA is included in a key data encapsulation (KDE) field of the message.

9. The method of claim 1, further comprising:

in response to determining that the AP does not support IRM, generating an association request that includes a private MAC address; and transmitting, from the STA, the association request to the AP.

10. The method of claim 1, further comprising:

in response to determining not to associate the STA with the AP using IRM, generating an association request that includes a private MAC address; and transmitting, from the STA, the association request to the AP.

11. A mobile station (STA) operable to associate with an access point (AP) using an identifiable random medium access control (MAC) address (IRMA), the STA comprising:

at least one receiver;

at least one transmitter;

at least one memory device with computer-executable instructions stored thereon; and at least one processor for executing the computer-executable instructions stored on the at least one memory device, wherein execution of the computer-executable instructions by the at least one processor causes the at least one processor to perform operations comprising:

processing a beacon received from an AP via the at least one receiver;

determining whether the AP supports identifiable random MAC (IRM) based on an IRM capability bit of the received beacon;

in response to determining that the AP supports IRM, further determining whether to associate the STA with the AP using IRM;

in response to determining to associate the STA with the AP using IRM, generating a message that includes an IRMA; and instructing the STA to transmit the message to the AP via the at least one transmitter.

12. The STA of claim 11, wherein the message is an association request.

13. The STA of claim 12, wherein the association request includes a random MAC address as a transmitter address.

14. The STA of claim 12, wherein execution of the computer-executable instructions further cause the at least one processor to perform operations comprising:

setting a capability bit of the association request to indicate that the STA supports IRM.

15. The STA of claim 11, wherein execution of the computer-executable instructions further cause the at least one processor to perform operations comprising:

determining whether the STA has previously associated with the AP;

in response to determining that the STA has previously associated with the AP, selecting a respective IRMA previously provided by the STA to the AP in a corresponding previous association with the AP as the IRMA to be included in the message; and in response to determining that the STA has not previously associated with the AP, selecting a random MAC address and creating a new IRMA to be included as the IRMA in the message.

16. The STA of claim 15, wherein determining whether the STA has previously associated with the AP comprises selecting the IRMA previously provided by the STA to the AP from a list of IRMAs already provided by the STA to APs previously associated with the STA.

17. The STA of claim 11, wherein the message is transmitted to the AP as part of a four-way handshake process.

18. The STA of claim 17, wherein the IRMA is included in a key data encapsulation (KDE) field of the message.

19. The STA of claim 11, wherein execution of the computer-executable instructions further cause the at least one processor to perform operations comprising:

in response to determining that the AP does not support IRM, generating an association request that includes a private MAC address; and instructing the STA to transmit the association request to the AP via the at least one transmitter.

20. The STA of claim 11, wherein execution of the computer-executable instructions further cause the at least one processor to perform operations comprising:

in response to determining not to associate the STA with the AP using IRM, generating an association request 5 that includes a private MAC address; and instructing the STA to transmit the association request to the AP via the at least one transmitter.

* * * * *